(12) United States Patent
Gudarzi et al.

(10) Patent No.: US 12,344,165 B2
(45) Date of Patent: *Jul. 1, 2025

(54) AUTO PANNING CAMERA MIRROR SYSTEM INCLUDING IMAGE BASED TRAILER ANGLE DETECTION

(71) Applicant: Stoneridge, Inc., Novi, MI (US)

(72) Inventors: Mohammad Gudarzi, San Diego, CA (US); Liang Ma, Rochester, MI (US); Troy Otis Cooprider, White Lake, MI (US)

(73) Assignee: STONERIDGE, INC., Novi, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/517,450

(22) Filed: Nov. 22, 2023

(65) Prior Publication Data
US 2024/0083356 A1 Mar. 14, 2024

Related U.S. Application Data

(63) Continuation of application No. 17/222,253, filed on Apr. 5, 2021, now Pat. No. 11,890,988.

(51) Int. Cl.
| | |
|---|---|
| *B60R 1/02* | (2006.01) |
| *G06T 7/60* | (2017.01) |
| *G06T 7/73* | (2017.01) |
| *G06V 10/25* | (2022.01) |
| *G06V 20/56* | (2022.01) |
| *H04N 7/18* | (2006.01) |
| *H04N 23/69* | (2023.01) |
| *H04N 23/695* | (2023.01) |

(52) U.S. Cl.
CPC ............... *B60R 1/02* (2013.01); *G06T 7/60* (2013.01); *G06T 7/73* (2017.01); *G06V 10/25* (2022.01); *G06V 20/56* (2022.01); *H04N 7/181* (2013.01); *H04N 23/69* (2023.01); *H04N 23/695* (2023.01); *B60R 2300/105* (2013.01); *B60R 2300/20* (2013.01); *B60R 2300/80* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 2014/0085472 | A1* | 3/2014 | Lu | B60R 1/26 348/148 |
| 2016/0320476 | A1* | 11/2016 | Johnson | G06T 7/20 |
| 2019/0184900 | A1* | 6/2019 | Lang | H04N 5/2628 |
| 2020/0317127 | A1* | 10/2020 | Archer | G01S 17/931 |

* cited by examiner

*Primary Examiner* — James M Anderson, II
(74) *Attorney, Agent, or Firm* — Carlson, Gaskey & Olds, P.C.

(57) ABSTRACT

An method for automatically panning a view for a commercial vehicle includes analyzing a portion of a first view at a first time to determine a position of a vehicle feature within the first view, wherein the first view is a subset of a second view, estimating an expected position of the vehicle feature in the first view at a second time subsequent to the first time, defining a region of interest centered on the expected position of the vehicle feature in the second view and analyzing the region of interest to determine an exact position of the vehicle feature at the second time, and determining a current trailer angle based on a position of the vehicle feature within the second view.

18 Claims, 6 Drawing Sheets

AUTO PANNING CAMERA MIRROR SYSTEM INCLUDING IMAGE BASED TRAILER ANGLE DETECTION

TECHNICAL FIELD

This disclosure relates to a camera mirror system (CMS) for use in a commercial truck, and in particular to a CMS having an auto-panning feature including image-based trailer angle detection.

BACKGROUND

Mirror replacement systems, and camera systems for supplementing mirror views, are utilized in commercial vehicles to enhance the ability of a vehicle operator to see a surrounding environment. Camera mirror systems (CMS) utilize one or more cameras to provide an enhanced field of view to a vehicle operator. In some examples, the mirror replacement systems cover a larger field of view than a conventional mirror, or include views that are not fully obtainable via a conventional mirror.

In certain applications, such as trailer reversing maneuvers, stationary views such as those provided by a fixed mirror or a fixed field of view camera may not provide a full view of the operation and desirable information that could be presented to the operator is not presented to the operator. Manual panning systems, where the operator manually adjusts a physical camera or mirror angle can require frequent stopping of the maneuver to adjust the view provided and can provide insufficient granularity to the adjustments.

SUMMARY OF THE INVENTION

An exemplary method for automatically panning a view for a commercial vehicle includes analyzing a portion of a first view at a first time to determine a position of a vehicle feature within the first view, wherein the first view is a subset of a second view, estimating an expected position of the vehicle feature in the first view at a second time subsequent to the first time, defining a region of interest centered on the expected position of the vehicle feature in the second view and analyzing the region of interest to determine an exact position of the vehicle feature at the second time, and determining a current trailer angle based on a position of the vehicle feature within the second view.

Another example of the above described method for automatically panning a view for a commercial vehicle further includes adjusting the first view at the second time based on the trailer angle, thereby ensuring that at least one additional feature of the vehicle is within the first view.

In another example of any of the above methods for automatically panning a view for a commercial vehicle the at least one additional feature is a rear edge of the vehicle In another example of any of the above methods for automatically panning a view for a commercial vehicle adjusting the first view comprises at least one of panning the first view within the second view, enlarging the first view within the second view, and shrinking the first view within the second view.

In another example of any of the above methods for automatically panning a view for a commercial vehicle adjusting the first view comprises panning the second view.

In another example of any of the above methods for automatically panning a view for a commercial vehicle adjusting the first view within the second view comprises maintaining an unchanged second view.

Another example of any of the above methods for automatically panning a view for a commercial vehicle further includes continuously iterating the method, thereby generating real time trailer angle monitoring.

In another example of any of the above methods for automatically panning a view for a commercial vehicle the first portion of the first view is a band extending a full horizontal length of the first view and less than a full height of the first view.

In another example of any of the above methods for automatically panning a view for a commercial vehicle the region of interest is a portion of the band.

In another example of any of the above methods for automatically panning a view for a commercial vehicle the vehicle feature is at least one wheel.

In another example of any of the above methods for automatically panning a view for a commercial vehicle the method is initiated in response to the vehicle initiating a reversing maneuver.

In another example of any of the above methods for automatically panning a view for a commercial vehicle estimating the expected position of the vehicle feature in the first view at the second time is based solely on the position of the vehicle feature within the second view determined by previous iterations of the method.

In another example of any of the above methods for automatically panning a view for a commercial vehicle estimating the expected position of the vehicle feature in the second view at the second time is based partially on one of a speed of the vehicle, a steering angle of the vehicle, yaw of the trailer, pitch of the trailer, roll, and acceleration of the vehicle 100.

In another example of any of the above methods for automatically panning a view for a commercial vehicle the first view is a class II view of a camera mirror system and the second view is a class IV view of a camera mirror system.

In one exemplary embodiment a camera mirror system for a vehicle includes a first camera having a first field of view, a controller configured to receive the first field of view and output a subset of the first field of view to a first display, the controller including an auto-panning module configured to determine a two dimensional trailer angle based on a position at least one vehicle feature in the first field of view, convert the two dimensional trailer angle to a three dimensional real world trailer angle, and adjust the output subset of the first field of view based on the three dimensional real world trailer angle.

In another example of the above described camera mirror system for a vehicle the auto-panning module determines the trailer angle by analyzing a portion of the first view at a first time to determine a position of a vehicle feature within the first view, determining a two dimensional angle defined between a first line passing through the feature location and a hitch point and a second line defining a vertical axis of the image, and converting the two dimensional angle into a three dimensional real world trailer angle, estimating an expected position of the vehicle feature in the first view at a second time subsequent to the first time, defining a region of interest centered on the expected position of the vehicle feature in the first view and analyzing the region of interest to determine an exact position of the vehicle feature at the second time, and determining new trailer angle at the second time based on a position of the vehicle feature within the first view.

Another example of any of the above described camera mirror vehicle systems for a vehicle further includes a second camera having a second field of view, the controller being configured to receive the second field of view and output a subset of the second field of view to the first display; and the auto-panning module being configured to determine the change in trailer angle based on the position of the at least one vehicle feature in each of the first field of view and the second field of view.

In another example of any of the above described camera mirror vehicle systems for a vehicle the auto-panning module is further configured to adjust the output subset of the first field of view based on the determined current trailer angle.

In another example of any of the above described camera mirror vehicle systems for a vehicle the adjustment to the output subset of the first field of view comprises at least panning the subset of the first field of view.

In another example of any of the above described camera mirror vehicle systems for a vehicle the first field of view is a Class IV field of view, and wherein the subset of the first field of view is a Class II view.

These and other features of the present invention can be best understood from the following specification and drawings, the following of which is a brief description.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
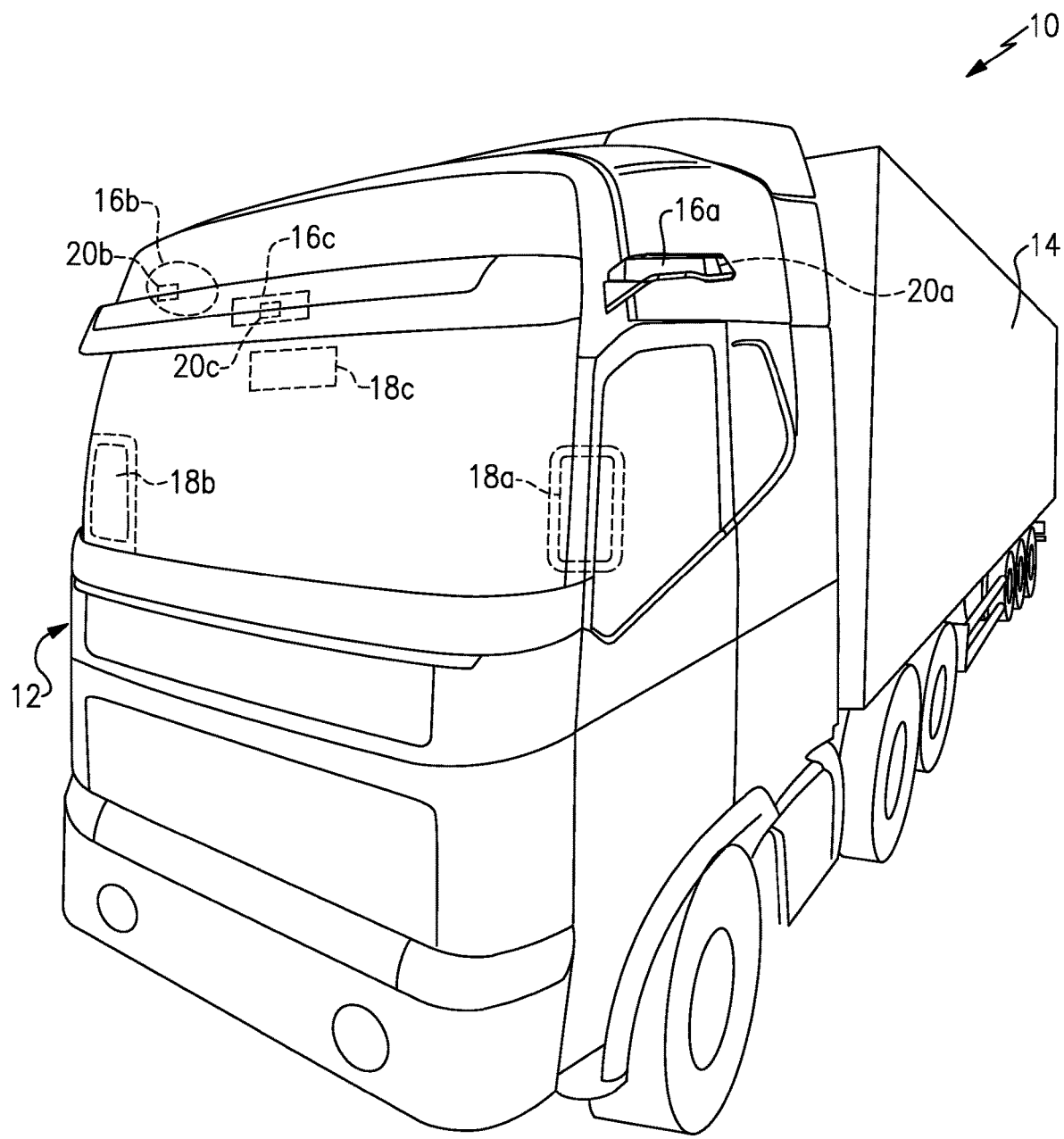
FIG. 1A is a schematic front view of a commercial truck with a camera mirror system (CMS) used to provide at least Class II and Class IV views.
Figure 1B:
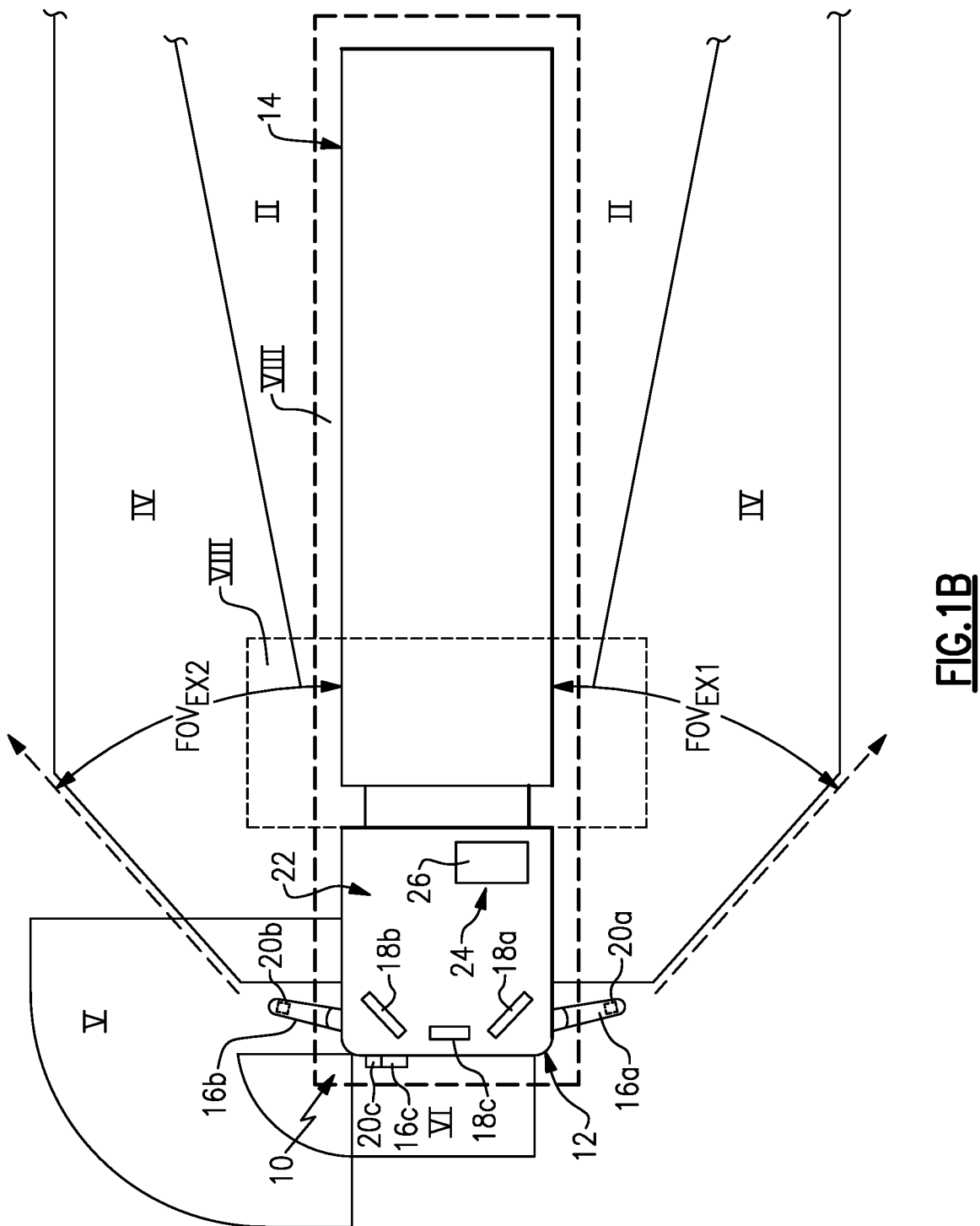
FIG. 1B is a schematic top elevational view of a commercial truck with a camera mirror system providing Class II, Class IV, Class V and Class VI views.
Figure 2:
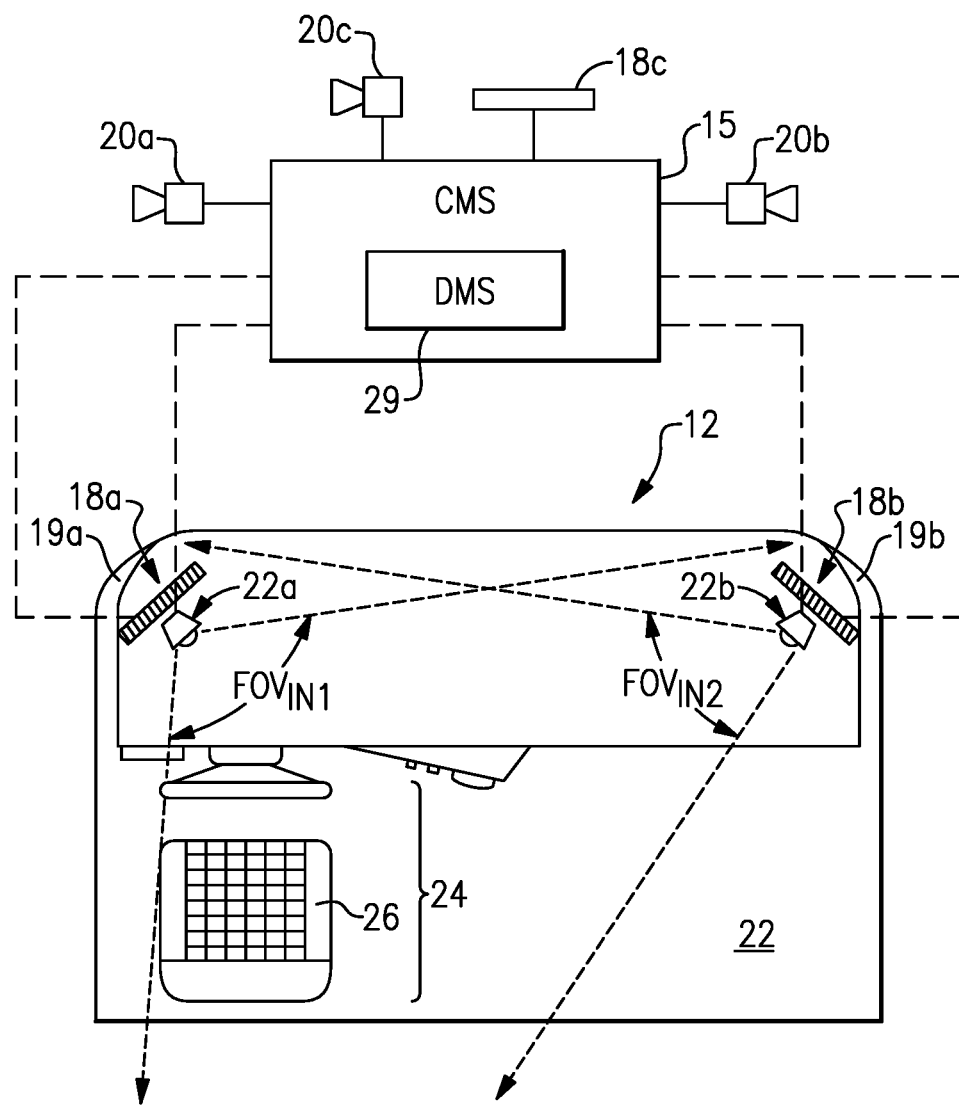
FIG. 2 is a schematic top perspective view of an vehicle cabin including displays and interior cameras.

A schematic view of a commercial vehicle 10 is illustrated in FIGS. 1A and 1B. The vehicle 10 includes a vehicle cab or tractor 12 for pulling a trailer 14. Although a commercial truck is contemplated in this disclosure, the invention may also be applied to other types of vehicles. The vehicle 10 incorporates a camera mirror system (CMS) 15 (FIG. 2) that has driver and passenger side camera arms 16a, 16b mounted to the outside of the vehicle cab 12. If desired, the camera arms 16a, 16b may include conventional mirrors integrated with them as well, although the CMS 15 can be used to entirely replace mirrors. In additional examples, each side can include multiple camera arms, each arm housing one or more cameras and/or mirrors.

Each of the camera arms 16a, 16b includes a base that is secured to, for example, the cab 12. A pivoting arm is supported by the base and may articulate relative thereto. At least one rearward facing camera 20a, 20b is arranged respectively within camera arms. The exterior cameras 20a, 20b respectively provide an exterior field of view $FOV_{EX1}$, $FOV_{EX2}$ that each include at least one of the Class II and Class IV views (FIG. 1B), which are legal prescribed views in the commercial trucking industry. The class II view on a given side of the vehicle 10 is a subset of the class IV view of the same side of the vehicle 10. Multiple cameras also may be used in each camera arm 16a, 16b to provide these views, if desired. Each arm 16a, 16b may also provide a housing that encloses electronics that are configured to provide various features of the CMS 15.

First and second video displays 18a, 18b are arranged on each of the driver and passenger sides within the vehicle cab 12 on or near the A-pillars 19a, 19b to display Class II and Class IV views on its respective side of the vehicle 10, which provide rear facing side views along the vehicle 10 that are captured by the exterior cameras 20a, 20b.

If video of Class V and Class VI views are also desired, a camera housing 16c and camera 20c may be arranged at or near the front of the vehicle 10 to provide those views (FIG. 1B). A third display 18c arranged within the cab 12 near the top center of the windshield can be used to display the Class V and Class VI views, which are toward the front of the vehicle 10, to the driver.

If video of class VIII views is desired, camera housings can be disposed at the sides and rear of the vehicle 10 to provide fields of view including some or all of the class VIII zones of the vehicle 10. In such examples, the third display 18c can include one or more frames displaying the class VIII views. Alternatively, additional displays can be added near the first, second and third displays 18a, 18b, 18c and provide a display dedicated to providing a class VIII view.

Figure 3B:
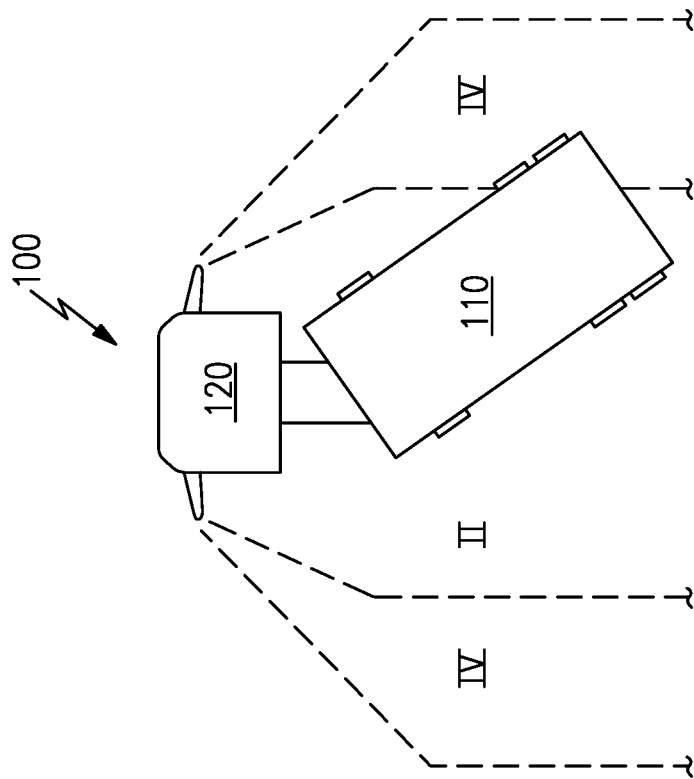
FIG. 3B illustrates the vehicle mid reversing maneuver, with a high trailer angle.
Figure 3A:
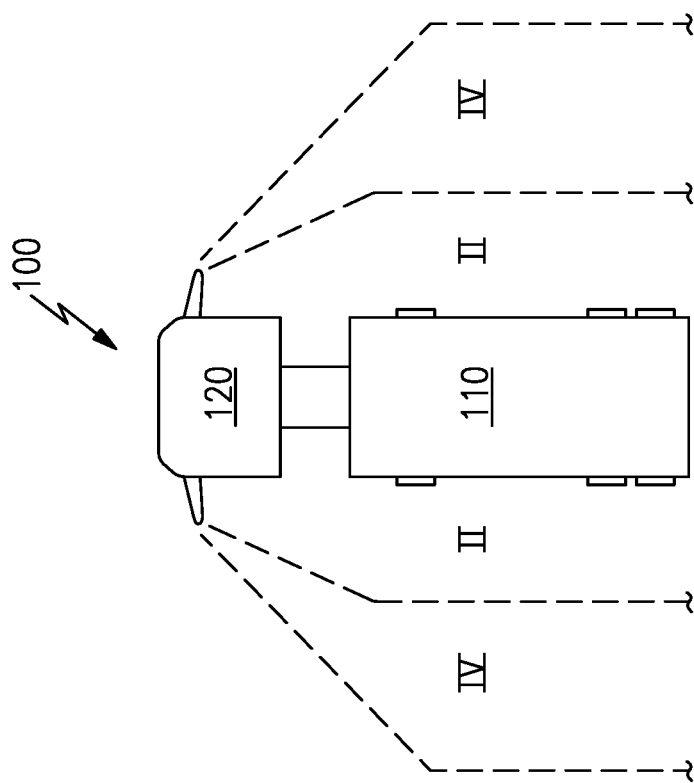
FIG. 3A illustrates a vehicle at the initiation of a reverse maneuver, with no trailer angle.
Figure 4:
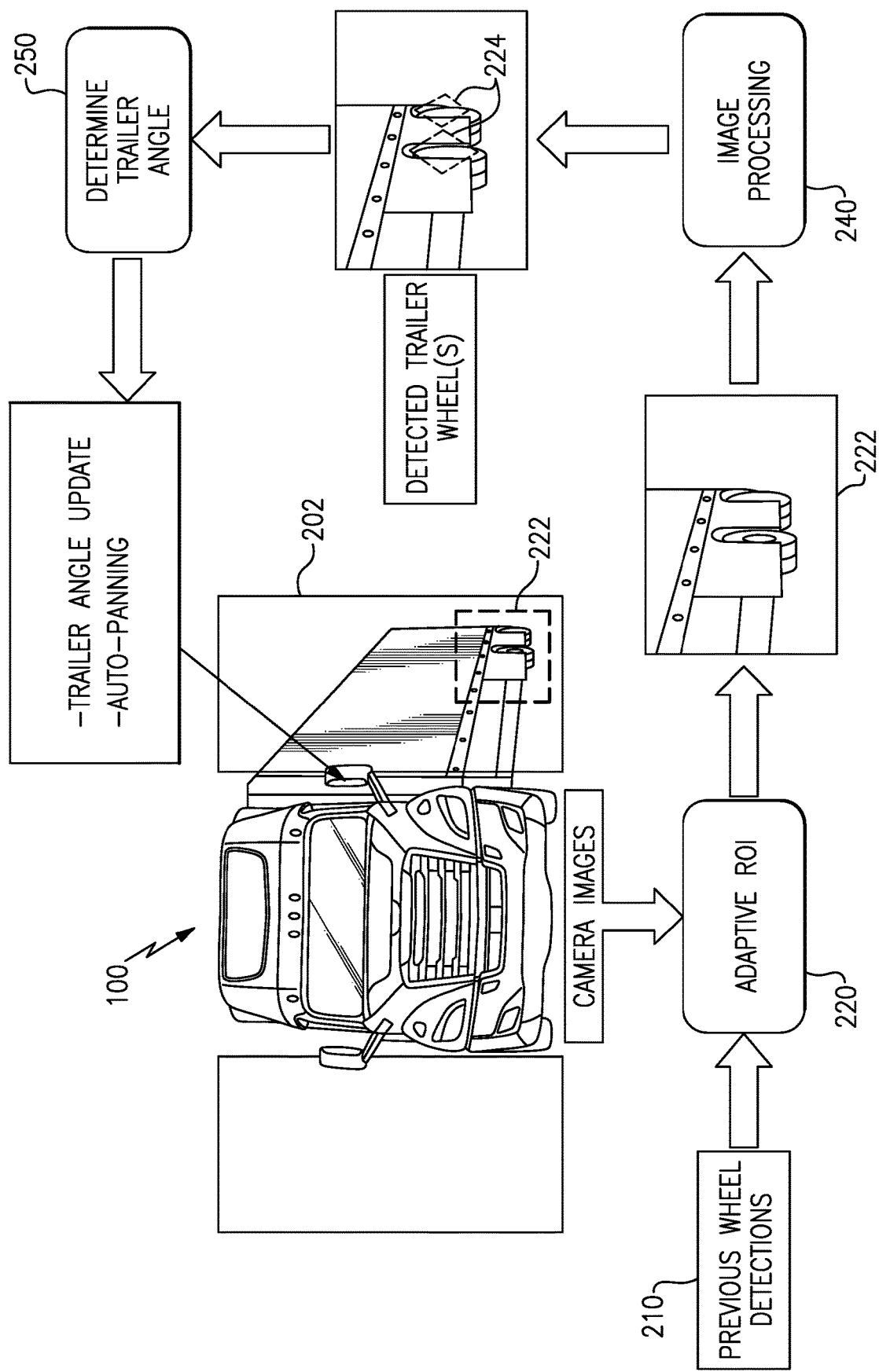
FIG. 4 illustrates an image-based process for automatically panning a display during a reversing maneuver.
Figure 5:
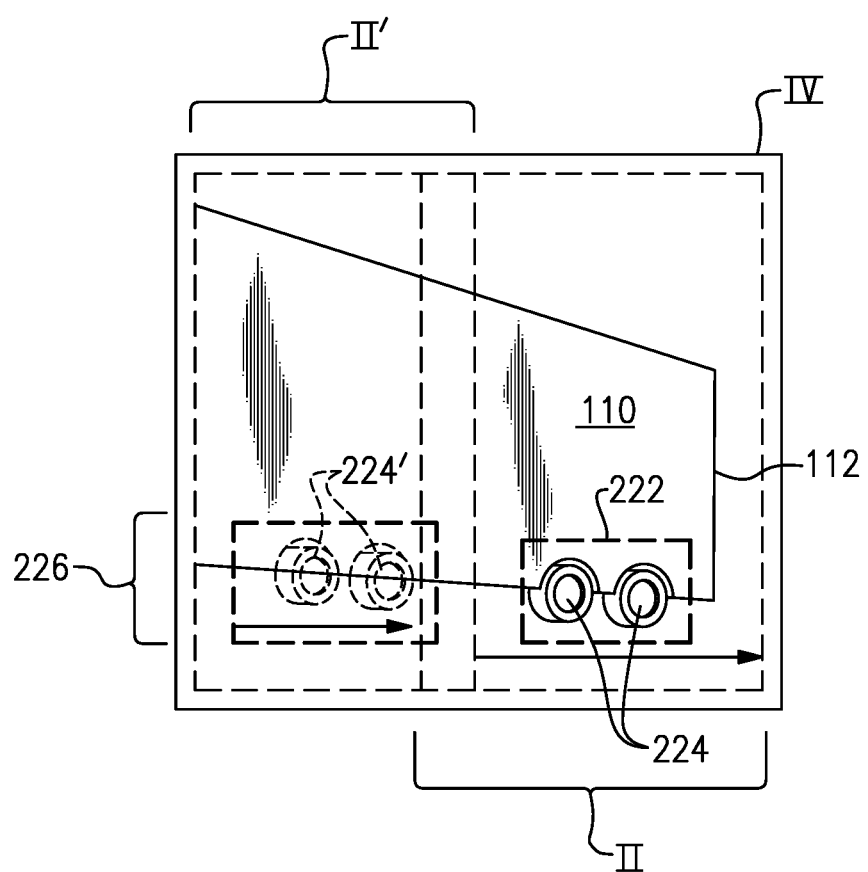
FIG. 5 illustrates an exemplary class IV field of view.

With continued reference to FIGS. 1A, 1B and 2 FIGS. 3A and 3B illustrate a vehicle 100 in the process of executing a reversing maneuver. In the initial position (FIG. 3A) the trailer 110 has an initial angle of approximately zero degrees relative to the cab 120, meaning that it is aligned with the orientation of the cab 120. This angle can alternatively be expressed as 180 degrees relative to the cab 120. During the process of reversing, and particularly when reversing through a turn, the trailer 110 skews relative the cab 120 (FIG. 3B) creating a trailer angle that impacts reversing maneuvers. The particular skew of FIG. 3B is exaggerated relative to most expected angles for the illustrative purposes.

In order to assist the driver in making the reversing maneuver, it is beneficial to ensure that the rear 112 of the trailer 110 is visible to the driver in at least one display through the reversing maneuver. In some particular examples, it is desirable to not only include the rear 112 of the trailer 110, but also to center the class II view on the rear 112 of the trailer 110. However, as illustrated in FIG. 3B, a static class II view can result in the rear 112 of the trailer 110 extending beyond the boundaries of the class II view even when the rear 112 remains within the Class IV field of view. In order to prevent loss of view of the rear 112 of the trailer 110 in the class II view, or to maintain centering of the class II view on the rear 112 of the trailer 110, the vehicle 10, 100 illustrated herein includes an auto-panning feature within the camera mirror system. The auto-panning feature uses an image based trailer angle detection and pans the class II view within the class IV field of view in order to provide continued visualization of the rear portion 112 of the trailer 110 based on the detected trailer angle without requiring physical or mechanical adjustments to a camera angle or camera position. In order to provide the correct panning amount, the auto-panning system uses a real-time estimation of the trailer's angle based on iterative image analysis to continuously adjust the panning of the class II view. The real time trailer angle estimation is provided by an image analysis module within the CMS and can be performed entirely, or partially, based on continuous analysis of the received class II and IV images received from the cameras.

In order to accurately estimate the trailer angle, the auto-panning system identifies a feature of the trailer 110 (e.g., a wheel) and tracks the position of the feature in the image. Based on the position of the feature within the image, the auto-panning system determines a two dimensional angle which is the angle between the line passing through the wheel location and the hitch point and a vertical axis of the image. The auto-panning system can then convert the two dimensional angle from the image into a three dimensional trailer angle in real space. In the example described herein, wheel detection is utilized due to the distinct shape, size and color of the wheels which allows the wheel to be distinguished from common shapes and features that may occur in the environment. In addition, wheels have a uniform shape, size, and color across multiple trailer types. While discussed within the context of a wheel detection, it is appreciated that alternative trailer features could be detected and utilized in the same manner and the process is not limited to wheel-based detection. Analyzing the full field of view in the class IV view to monitor the trailer position 112 is resource intensive and can result in delays in auto-panning or sub-optimal reversing operations due to the amount of data contained in each image.

With continued reference to FIGS. 1A-3B, FIG. 4 illustrates the auto-panning process of exemplary vehicle 100. Initially the auto-panning process identifies the location of the wheels in the class II view at a known trailer 112 angle. This detection defines the initial, or previous, wheel detection position 210. In iterations subsequent to the initial iteration, the previous wheel detection position 210 is the position within the image where the wheel was detected in the immediately prior iteration.

Once the previous wheel location within the class II/Class IV image is received, an adaptive region of interest (ROI) process 220 determines bounds within which the wheel is likely to be found in the new images received from the vehicle 100. The area inside the bounds is referred to as the region of interest. The initial wheel detection can be performed in a limited region of interest forming a band across the image. Subsequent iterations can narrow the band to a rectangle corresponding to the expected wheel position, based on the knowledge of the previous wheel position(s). Once the region of interest is established within the received image, an image processing unit 240 within the CMS analyses only the region of interest to identify the position of the wheels within the region of interest.

In some examples, the size and shape of the region of interest can include predefined dimensions, with the predefined dimensions representing a maximum deviation that the wheel is expected to travel in between iterations. The region of interest is then centered on the identified location of the wheel in the previous image, and the wheel identification is performed. In these examples the auto-panning feature can be fully self-contained within the camera mirror system, and no additional sensor data is required. In one modification to the fully self-contained auto-panning system, the camera mirror system can infer an expected direction of motion of the wheel position from a wheel motion through the images of two or more previous iterations and can determine an expected position of the wheel from the inference. In this case, the region of interest is centered on the expected location of the wheel, rather than being centered on the previous location of the wheel. In further implementations, the inference can be used to enlarge or shrink the region of interest.

In other examples, the shape and position of the region of interest can be defined on the fly based on additional factors including the speed of the vehicle 100, a steering angle of the vehicle 100, yaw of the trailer, pitch of the trailer, roll, acceleration of the vehicle 100, or any similar sensor information that may impact an expected position of the feature being detected. In this example, the camera mirror system utilizes kinematic models of vehicle reversing combined with the received sensor data to define an expected motion of the wheel through the image. The Auto-panning feature determines where the wheel is likely to be based on the expected motion and centers the adaptive region of interest around the expected wheel location.

In once specific alternate example, the CMS can include image based motion detection modules configured to detect portions of an image that are in motion relative to the originating camera and portions of the image that are not in motion. In such a system, the CMS defines the not-in-motion portions of the image as the "vehicle", and the in-motion portions of the image as the background. This definition allows an initial region of interest to be defined as the vehicle, since it is known that the feature will always be located on the vehicle. Subsequent to the initial region of interest definition, the region of interest can be further narrowed to a subset of the detected vehicle portions in the previously described manner.

Once the size and positioning of the region of interest is determined, the image is processed using an image processing module 240 to identify the wheel (or wheels) within the region of interest. The analysis is limited to only the region of interest, thereby saving processing power and time and reducing potential false positives by not analyzing the majority of the image.

Once the position 224 of the wheel(s) in the region of interest 222 is determined using the image processing module 240, the CMS uses the known position 224 of the wheel(s) in the image combined with the known position of a trailer hitch to determine the two dimensional angle of the image, as described above. The relationship used to convert from the two dimensional angle determined to a real world three dimensional angle can be determined based on experimental analysis of the specific vehicle configurations, adaptive learning processes, or any similar process.

Once the new trailer angle has been estimated, the positioning of the Class II view within the Class IV view is adjusted based on the new trailer angle in order to ensure that the rear edge 112 of the trailer 110 is maintained within the Class II view. The adjustment occurs automatically, without input from the driver and is referred to as auto-panning.

With continued reference to FIGS. 1A-4, FIG. 5 illustrates a class IV field of view (IV) throughout the auto-panning operation discussed above. In an initial portion of the reversing maneuver, an initial class II view (II') is displayed in the driver's class II view. An initial wheel position 224' is detected within a region of interest band 226 across the view II'. Based on the initial position 224', the CMS determines an estimated wheel position and centers a narrowed region of interest 222 on the expected position of the wheels.

The region of interest 222 is analyzed via the image analysis system to determine the exact position of the wheels 224 within the region of interest 222. The position 224, 224' of the wheels within the image is applied to a known relationship to determine a current trailer angle Based on the new trailer angle, the CMS adjusts the class II view (II, II') to maintain a view of the rear 112 of the trailer 110. In the illustrated example, the view (II) is shifted right, and widened within the class IV field of view.

In some examples, the process described herein iterates approximately every 40 ms, although alternative periods between iterations could be used to similar effect. Further, the particular shifting illustrated is substantially larger than would be expected in a conventional operation as it is exaggerated for explanatory effect.

Although an example embodiment has been disclosed, a worker of ordinary skill in this art would recognize that certain modifications would come within the scope of the claims. For that reason, the following claims should be studied to determine their true scope and content.

What is claimed is:

1. A method for automatically panning a view for a vehicle comprising:
   a) analyzing a portion of a first image to determine a position of a vehicle feature of a trailer within the first image, wherein the first image is from a first view at a first time and wherein the first view is a subset of a second view;
   b) based upon the position of the vehicle feature of the trailer within the first image determined in step a), estimating an expected position of the vehicle feature in the second view at a second time subsequent to the first time;
   c) defining a region of interest based upon the expected position of the vehicle feature in a second image from the second view at the second time;
   d) analyzing the region of interest in the second image to determine an exact position of the vehicle feature at the second time; and
   e) determining a current trailer angle based on the exact position of the vehicle feature determined in step d).

2. The method of claim 1, further comprising adjusting the first view based on the current trailer angle determined in step e).

3. The method of claim 2, wherein adjusting the first view comprises at least one of panning the first view within the second view, enlarging the first view within the second view, and shrinking the first view within the second view.

4. The method of claim 2, wherein adjusting the first view comprises panning the second view.

5. The method of claim 1, further comprising continuously iterating the method, thereby generating real time trailer angle monitoring.

6. The method of claim 1, wherein the portion of the first image is a band extending a full horizontal length of the first view and less than a full height of the first view.

7. The method of claim 6, wherein the region of interest is a portion of the band.

8. The method of claim 1, wherein the vehicle feature is at least one wheel.

9. The method of claim 1, wherein the method is initiated in response to the vehicle initiating a reversing maneuver.

10. The method of claim 1, wherein estimating the expected position of the vehicle feature in the first view at the second time is based solely on the position of the vehicle feature within the second view determined by previous iterations of the method.

11. The method of claim 1, wherein estimating the expected position of the vehicle feature in the second view at the second time is based partially on one of a speed of the vehicle, a steering angle of the vehicle, yaw of the trailer, pitch of the trailer, roll, and acceleration of the vehicle.

12. The method of claim 1, wherein the first view is a class II view of a camera mirror system and the second view is a class IV view of a camera mirror system.

13. A camera mirror system for a vehicle comprising:
   a first camera having a first field of view;
   a controller configured to receive the first field of view, to output an output subset of the first field of view to a first display, and to adjust the output subset of the first field of view based on a trailer angle; and
   the controller configured to determine the trailer angle based on a position of a vehicle feature in the first field of view at a first time, to estimate an expected position of the vehicle feature in the first field of view at a second time subsequent to the first time, to define a region of interest centered on the expected position of the vehicle feature in the first field of view, to analyze the region of interest to determine an actual position of the vehicle feature at the second time, and to determine a new trailer angle at the second time based on the actual position of the vehicle feature within the first field of view.

14. The camera mirror system of claim 13, wherein the controller is configured to determine a two dimensional angle defined between a first line passing through a location of the vehicle feature and a hitch point and a second line defining a vertical axis of the first field of view and to convert the two dimensional angle into a three dimensional real world trailer angle.

15. The camera mirror system of claim 13, further comprising a second camera having a second field of view, the controller being configured to receive the second field of view and output a subset of the second field of view to the first display; and the controller being configured to determine a change in trailer angle based on the position of the vehicle feature in each of the first field of view and the second field of view.

16. The camera mirror system of claim 13, wherein the adjustment to the output subset of the first field of view comprises at least panning the output subset of the first field of view.

17. The camera mirror system of claim 13, wherein the first field of view is a Class IV field of view, and wherein the output subset of the first field of view is a Class II view.

18. The method of claim 1 wherein the expected position is where the vehicle feature is expected to be at the second time.

* * * * *